United States Patent
Peate

[15] 3,643,974
[45] Feb. 22, 1972

[54] BICYCLE FORK EXTENSION

[72] Inventor: Norman T. Peate, 5951 East 18th St., Tucson, Ariz. 85711

[22] Filed: Apr. 3, 1970

[21] Appl. No.: 25,459

[52] U.S. Cl. ........................................... 280/278, 280/279
[51] Int. Cl. ........................................................ B62k 21/02
[58] Field of Search .................. 280/278, 279, 276, 274, 281, 280/287, 284, 7.1, 7.14, 7.15, 7.16; D90/9, 1, 8

[56] References Cited

UNITED STATES PATENTS

| 1,548,680 | 8/1925 | Grabowski | 280/279 X |
| 2,011,402 | 8/1935 | Gallo | 280/7.1 |
| 3,113,785 | 12/1963 | Bohnenkamp | 280/278 X |

FOREIGN PATENTS OR APPLICATIONS

| 1,083,394 | 6/1954 | France | 280/276 |
| 433,487 | 10/1911 | France | 280/276 |
| 82,157 | 10/1956 | Denmark | 280/279 |

Primary Examiner—Kenneth H. Betts
Attorney—J. Gibson Semmes

[57] ABSTRACT

The present invention comprises a dragster rail or bicycle fork extension adapted to either nonmotorized or motorized bicycles, the respective elements of which are stabilized against misplacement by a yoke member.

1 Claim, 4 Drawing Figures

PATENTED FEB 22 1972

3,643,974

INVENTOR
NORMAN T. PEATE

BY John Gibson Semmes
ATTORNEY

BICYCLE FORK EXTENSION

BACKGROUND OF THE INVENTION

Field of the Invention

The invention is such as to encompass any type of bicycle, irrespective of size and is adapted to give the dragster effect, dependent upon preselected variable-angle adjustment or existing bicycle fork style.

SUMMARY OF THE INVENTION

The invention is adapted to provide a dragster effect for the existing bicycle fork and it comprises an extension therefor, braced intermediate ends thereof, against disposition while maintaining sufficient rigidity to insure safety in turning and related maneuvers.

DESCRIPTION OF THE PREFERRED EMBODIMENTS

Figure 1:
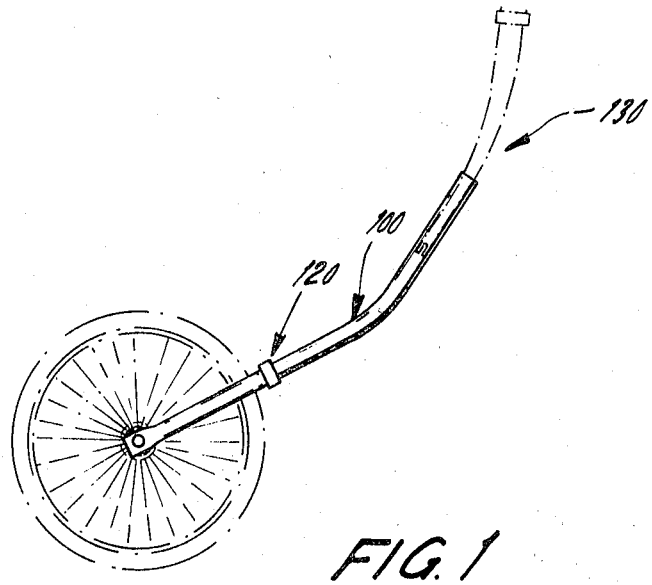
FIG. 1 is a view in side elevation showing the dragster rail bicycle fork extension engaging the existing bicycle fork at one end and the forward wheel of a bicycle at another end.
Figure 2:
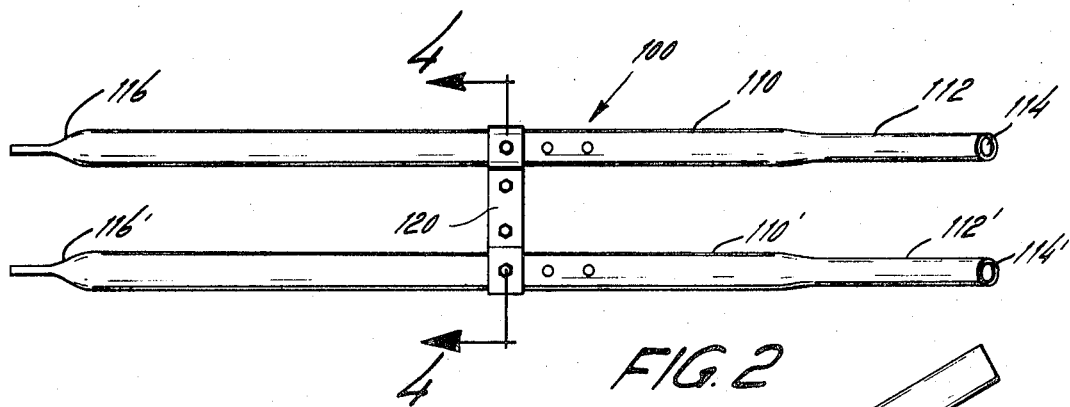
FIG. 2 is a top plan view of invention, enlarged, showing the extension components disassembled.
Figure 3:
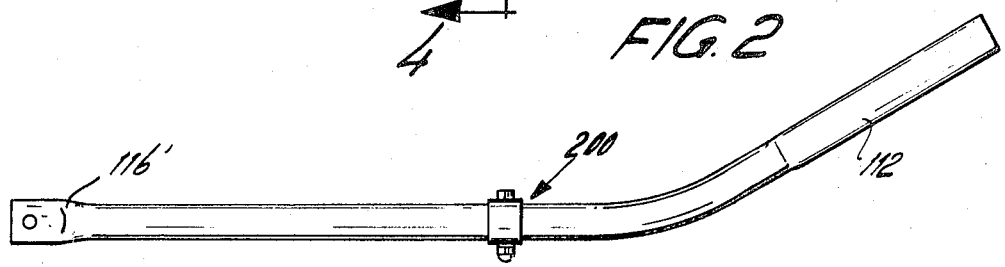
FIG. 3 is a side elevation thereof, based upon FIG. 2.
Figure 4:
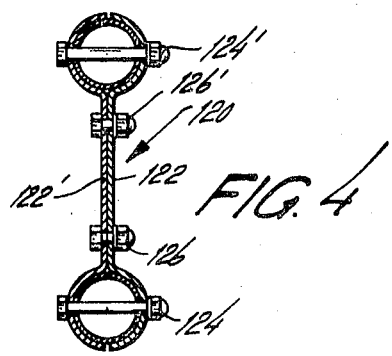
FIG. 4 is an expanded view of brace member, securing the respective extension elements in spaced-apart relation as illustrated especially in FIG. 2.

The dragster rail bicycle fork extension 100 comprises tubular wheel and bicycle fork engaging extension members 110 and 110', the respective extensions having upper portions 112 and 112', which are of substantially elliptical cross section and adapted to receive the lower portion of the existing bicycle fork as shown in FIG. 1. The fit of the lower portion of the existing bicycle fork being by frictional engagement of the former in the latter. The extensions are bent, at, for example at 30° angle, said angle being variable, depending upon the existing angular relationship of the extant bicycle fork to effect a safe supporting relationship between the bicycle frame and the wheel. At the opposite end of the tubular members 110 and 110', the tubular members are fashioned so as to receive the axle of the forward wheel in the usual manner, see 116 and 116', apertured as shown. In the present illustration, the main portion 110 and 110' of the respective tubular members is of circular cross section, whereas the ends of 112, 112' are of elliptical cross section, the elongate configuration extending from front to rear of the vehicle, as will be apparent from reference to FIGS. 2 and 3. The respective tubular extension members are secured in spaced apart relation by the cross brace 120 comprising related tubular extension engaging elements 122 and 122', the same being secured to the tubular elements through corresponding apertures, all as indicated in FIG. 4, reference the securing bolts 124 and 124'. The respective yoke members forming the brace are secured by fastening means 126 and 126', although other suitable means as by weldment could effect the same purpose. In the present system nonetheless, the extensions are adapted to facile setting up for the purposes indicated.

In the placement of the extended bicycle fork herein on a vehicle, one removes the wheel from the extant bicycle fork and slips the extended bicycle fork herein onto the extant bicycle fork by tapping the latter into the corresponding portions 112, 112'. The brace on 120 can be moved from position to position on the respective extended bicycle forks, dependent upon the wheel diameter and the wheel thereafter installed in the usual manner.

I claim:

1. A bicycle dragster component adapted to the front steering wheel, comprising tandem extensions to secure the extant wheel support fork, said extensions being braced in spaced apart relation by a stability brace adjustably engaging the respective extensions at a point which is substantially adjacent the external diameter of the bicycle wheel, and having at the upper end of each said extension an extant preselected fork-receiving portion which is oval in cross section, said portion being adapted to receive the respective extant bicycle fork ends and to secure them against displacement by frictional fit, and having at the opposite end of said extensions wheel-engaging portions.

* * * * *